UNITED STATES PATENT OFFICE.

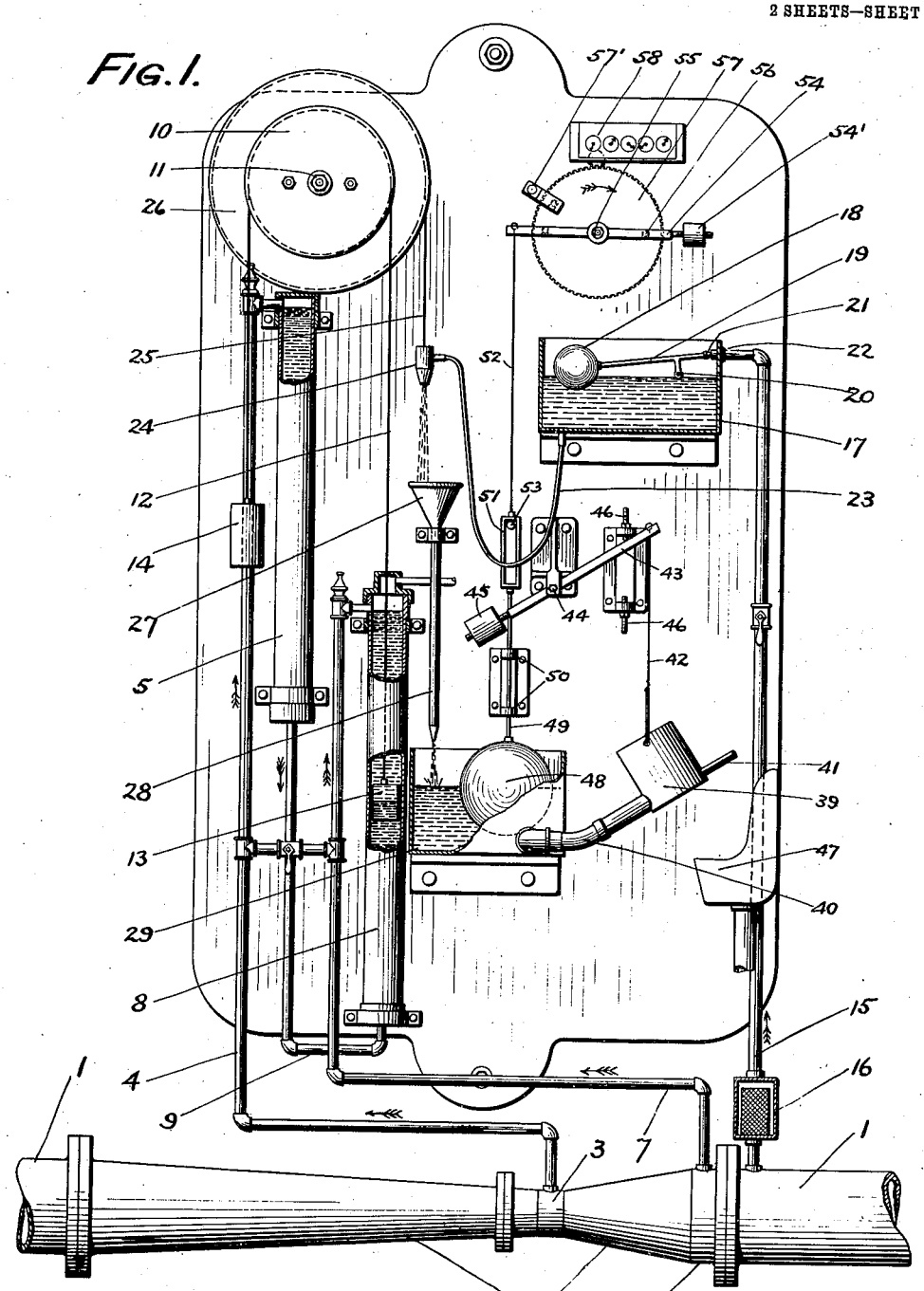

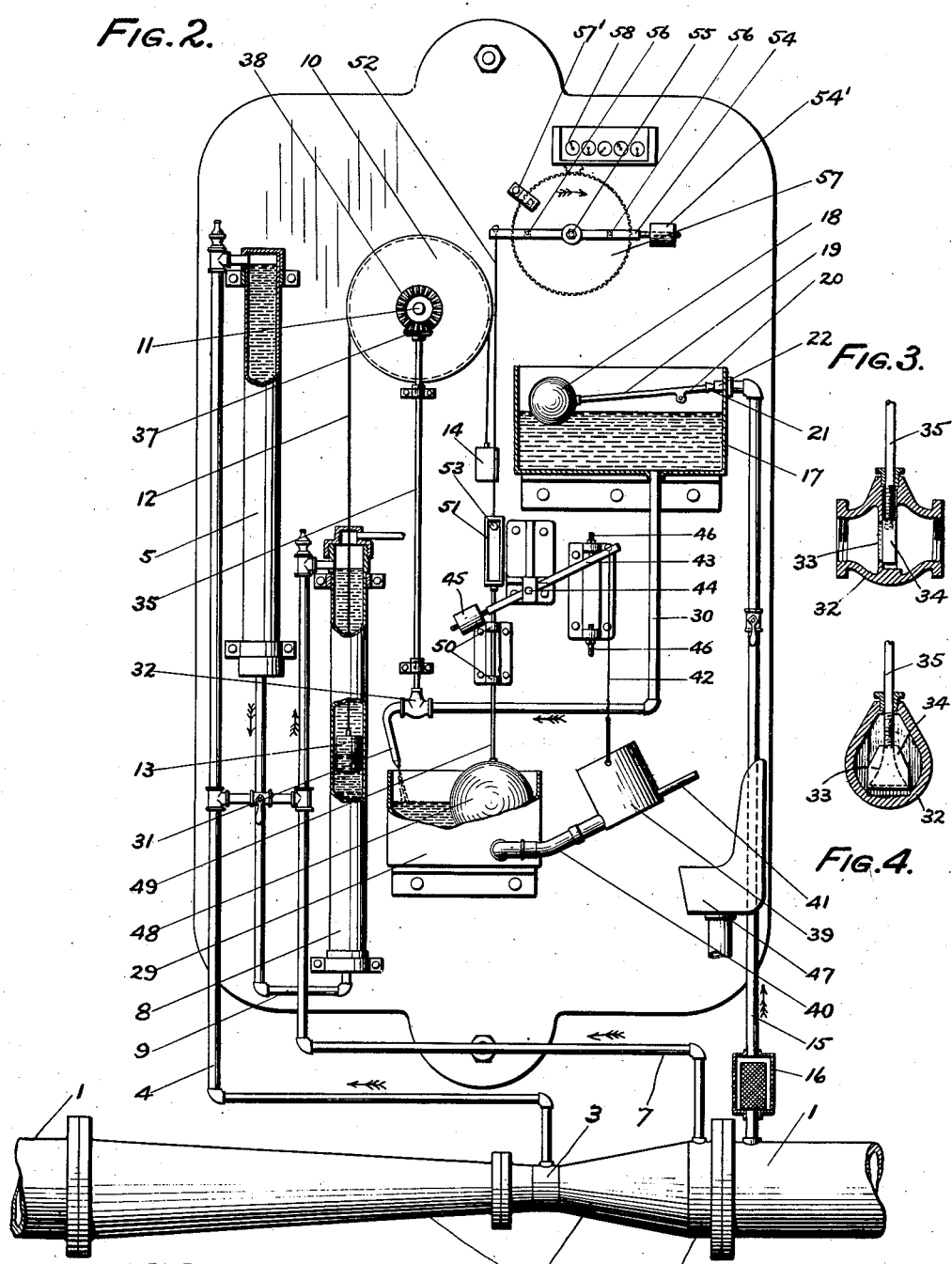

JOHN W. LEDOUX, OF SWARTHMORE, PENNSYLVANIA, ASSIGNOR TO SIMPLEX VALVE & METER COMPANY, OF CAMDEN, NEW JERSEY, A CORPORATION OF NEW JERSEY.

LIQUID-METER.

956,374. Specification of Letters Patent. Patented Apr. 26, 1910.

Application filed July 9, 1906. Serial No. 325,216.

*To all whom it may concern:*

Be it known that I, JOHN W. LEDOUX, a citizen of the United States, and resident of Swarthmore, in the county of Delaware and State of Pennsylvania, have invented certain Improvements in Liquid-Meters, of which the following is a specification.

This invention is a liquid meter providing improved means under control of the velocity head for directly measuring a proportionate part of the flow and therefrom indicating the total flow.

In the accompanying drawings, Figure 1 represents a sectional elevation of a form of my invention: Fig. 2 represents a sectional elevation of a second form thereof: Fig. 3 represents a longitudinal sectional view, and Fig. 4 represents a transverse sectional view of a valve used in the form of the invention shown in Fig. 2.

As shown in Figs. 1 and 2 of the drawings, a main conduit 1 provided with a venturi section 2 has the throat 3 of the venturi section connected by a tube 4 with the top of the pressure reservoir 5, and the normal section 6 connected by the tube 7 with the top of the pressure reservoir 8, the reservoirs being closed at their tops and connected at their bottoms by means of a tube 9.

A pulley or balance wheel 10 is supported to revolve on the axis 11 and supports a cord or fine wire 12 adapted to reciprocate through the top of the reservoir 8. The part 12 supports a float 13 counter-balanced by a weight 14, the float resting on and moving with a column of liquid heavier than that to be measured, as mercury, whose heights in the reservoirs 5 and 8 fluctuate with the pressure of the liquid from the main conduit communicating therewith.

A pipe 15, having a screen 16 therein, leads from the main conduit 1 to the top of a tank 17. A float 18 in the tank is connected with a lever 19, pivoted on the fulcrum 20 (suitably a rod supported by the tank), which operates a valve 21 for controlling the inlet 22 from the pipe to the tank and maintaining a constant level of liquid therein.

As shown in Fig. 1, a flexible tube 23 leads from the bottom of the tank to a nozzle 24, which is connected by a cord 25 with a disk or balance 26 fixed to the disk 10 and oscillating therewith on the axis 11 so that the elevation of the nozzle 24 corresponds to that of the float 13 and consequently to the velocity head of the liquid in the main conduit, of which said elevation is a function.

As the apparatus is designed so that a substantially constant head will be maintained in the tank 17, the discharge therefrom through the tube 23 and nozzle 24 will vary with the elevation of the nozzle 24, a function of the velocity head of the liquid in the main conduit 1. The discharge from the nozzle 24 is received by a funnel 27 and a tube 28 which carries it to a receptacle 29.

As shown in Figs. 2, 3, and 4, the liquid is discharged from the bottom of the tank 17 through the stationary pipe 30 and the nozzle 31 to the receptacle 29, the rate of flow through this pipe being controlled by a valve 32. This valve is provided with a port 33 and with a gate 34 which is moved by a rod 35 having a screw connection 36 therewith, the rod being revolved by a beveled gear 37 fixed thereon which engages a beveled gear 38 fixed to the pulley 10. The valve gate is thus moved proportionately to the movement of the float 13 and the port is of such form that it provides an aperture variable with the velocity head of the liquid in the main conduit and is therefore a function of the rate of flow therein.

As shown in Figs. 1 and 2, the receptacle 29 has a vessel 39 connected with the lower part thereof by a flexible conduit 40, the vessel being provided with a discharging passage 41 of smaller capacity than the conduit 40. The vessel has a connection 42 with the lever 43 fulcrumed on the bearing 44 and counter-balanced by a weight 45, the oscillation of the lever being limited by adjustable stops 46. When the liquid in the receptacle 29 and in the vessel 39 have reached a level such that the head or weight in the vessel is sufficient to counter-balance the weight 45, the vessel falls and discharges by the passage 41 into the spill-basin 47, the throttling outlet maintaining the load in the vessel until the receptacle 29 has discharged to a definite level, the filling and emptying of the receptacle thus taking place at a rate proportional to the flow of liquid through the main.

A float 48, supported by the liquid in the receptacle 29, is reciprocated thereby and reciprocates a rod 49 working in ways 50 and having a buckle 51 on the upper end thereof. A cord or slender rod 52, with an enlargement as a ball 53, on the bottom thereof, is connected with the top of the buckle and with the end of a lever 54 having a counter-balance 54' on the opposite end, the lever being adapted to oscillate on an axis 55. This lever is provided with a known form of clutches 56 which actuate a toothed disk 57, the clutches engaging the disk to advance it through a definite arc upon the movement of the lever in one direction and running freely without moving the disk upon the movement of the lever in the opposite direction, a clutch 57' preventing the reverse movement of the disk. This clutching mechanism is similar to that shown in my Patent #790,693 excepting in its location to engage the side instead of the periphery of the disk. A register or indicating device is connected with and operated by the disk at a rate proportionate to the flow to register or indicate the volume thereof.

There is thus provided an apparatus by which a small volume of liquid, flowing under control of the velocity or pressure head of the liquid to be measured so as to be a definite proportion of the total flow, is measured by the operation described, and therefrom an indication made of the total flow.

Having described my invention, I claim:—

1. A liquid meter comprising a liquid conduit, a pressure reservoir containing a liquid heavier than that in said conduit, means whereby the flow in said conduit regulates the height of the liquid in said reservoir, a second liquid conduit, and means whereby the height of the liquid in said reservoir regulates the flow through said second conduit.

2. A liquid meter comprising a conduit, a pressure reservoir connected with said conduit, a vertically reciprocating float in said reservoir, mechanism for balancing said float, mechanism connected with said float and movable through variations in the liquid pressure in said conduit and reservoir for controlling the flow of a liquid so that its quantity bears a definite ratio to the quantity of liquid flowing in said conduit, and mechanism for measuring the flow of the controlled liquid.

3. A liquid meter comprising a conduit, a pressure reservoir connected with and apart from said conduit, a receptacle, mechanism under control of the pressure in said reservoir for regulating the flow of a liquid to said receptacle in amount proportional to that flowing in said conduit, mechanism whereby said receptacle discharges upon the accumulation of a certain amount of liquid therein, and indicating mechanism operated under control of the operations of charging and discharging said receptacle.

4. A liquid meter comprising a conduit, a pressure reservoir connected with said conduit and containing liquid heavier than that to be measured, a tank connected with said conduit, a receptacle, means for discharging the liquid from said tank into said receptacle, and mechanism controlled by variations in the height of said liquid in said pressure reservoir for governing the flow from said tank to said receptacle.

5. A liquid meter comprising a conduit, a receptacle, mechanism under control of the pressure in said conduit for conveying a proportionate part of the liquid flowing in said conduit to said receptacle, means whereby said receptacle discharges upon the accumulation of a predetermined load, an indicating device, and mechanism whereby said indicating device is operated at the rate and by means of the loading and discharging of said receptacle.

6. A liquid meter comprising a conduit, a reservoir connected with said conduit, a device movable in said reservoir with variations in the flow through said conduit, means comprising a flexible tube having a movable outlet, and means connecting said device and the outlet of said tube so that the elevation of said outlet is varied with the elevation of said device.

7. A liquid meter comprising a conduit, means comprising a flexible tube having a movable outlet, and mechanism whereby the elevation of said outlet is determined by the pressure of the liquid in said conduit.

8. A liquid meter comprising a flexible tube having a movable outlet, means for charging said tube and mechanism movable with variations in the head of a liquid for regulating the elevation of said outlet.

9. An apparatus for utilizing differential pressure to measure the flow of fluid through a conduit, said apparatus comprising a differential pressure mechanism including a chamber containing a liquid heavier than the fluid in said conduit, and having suitable pressure connections to said conduit, a source of measuring liquid, discharging means controlled by the differential pressure mechanism to produce a discharge of said measuring liquid proportional to the flow of fluid through said conduit, and means for measuring the discharged measuring liquid.

In testimony whereof I have hereunto set my name this 26th day of June, 1906, in the presence of the subscribing witnesses.

JOHN W. LEDOUX.

Witnesses:
ROBERT JAMES EARLEY,
Jos. G. DENNY, Jr.